US006877198B2

(12) United States Patent
Shevela

(10) Patent No.: US 6,877,198 B2
(45) Date of Patent: Apr. 12, 2005

(54) CYLINDER LINER REMOVER AND INSTALLER

(75) Inventor: Michael Shevela, Harrison Township, MI (US)

(73) Assignee: SPX Corporation, Charlotte, NC (US)

( * ) Notice: Subject to any disclaimer, the term of this patent is extended or adjusted under 35 U.S.C. 154(b) by 103 days.

(21) Appl. No.: 10/151,010

(22) Filed: May 21, 2002

(65) Prior Publication Data

US 2003/0217465 A1 Nov. 27, 2003

(51) Int. Cl.[7] .................................................. B23P 19/04

(52) U.S. Cl. ............................. 29/264; 29/258; 29/259; 29/263; 29/266; 29/280; 29/888.061; 254/100

(58) Field of Search .......................... 29/258, 259, 263, 29/264, 266, 280, 269, 898.07, 898.08, 888.061, 426.1, 426.5; 254/100, 101, 222, 214

(56) References Cited

U.S. PATENT DOCUMENTS

| | | | | | |
|---|---|---|---|---|---|
| 1,230,448 | A | * | 6/1917 | Tuttle | 29/264 |
| 1,554,412 | A | * | 9/1925 | Coolidge | 29/264 |
| 1,573,572 | A | * | 2/1926 | Rees | 29/264 |
| 2,650,419 | A | * | 9/1953 | Barbisch | 29/266 |
| 3,340,593 | A | * | 9/1967 | Savastano | 29/262 |
| 3,691,612 | A | * | 9/1972 | Layne | 29/266 |
| 4,057,889 | A | * | 11/1977 | Ferguson | 29/426.5 |
| 4,769,890 | A | * | 9/1988 | Maynard | 29/259 |
| 5,408,733 | A | * | 4/1995 | Blankenship | 29/262 |
| 5,848,460 | A | * | 12/1998 | Rasmussen et al. | 29/263 |
| 6,212,775 | B1 | * | 4/2001 | Sarver et al. | 29/898.08 |

OTHER PUBLICATIONS

Series 55 Service Manual. Detroit Diesel Corp. pp. 1–185B–D. 1996.*

SPX Kent–Moore, "Special Service Tools for Detroit Diesel Engines", 3 Pages.1998.

* cited by examiner

*Primary Examiner*—David P. Bryant
*Assistant Examiner*—Eric Compton
(74) *Attorney, Agent, or Firm*—Baker & Hostetler LLP

(57) ABSTRACT

A liner remover and installer assembly for a cylinder that includes a base having an opening to receive a rod with a tool at an end, an adjustment member and a support member. The support member can have an alignment feature adapted to mate with a dowel pin on an engine block. The tool can be a liner installer or remover. The liner remover can have a shoe with a lip. The support member and the lip can be made from a material that will not score the engine such as aluminum.

20 Claims, 3 Drawing Sheets

CYLINDER LINER REMOVER AND INSTALLER

FIELD OF THE INVENTION

The present invention relates generally to an apparatus and a method to remove and install a liner. More particularly, the present invention relates to an apparatus and method to remove and install the liner in a cylinder of an engine.

BACKGROUND OF THE INVENTION

Conventional combustion, reciprocating engines are widely used as automotive engines. A conventional engine (single-cycle, two-cycle and others) is typically composed of an engine or cylinder assembly having one or more cylinders therein. A piston is slidably disposed in the cylinder and moves reciprocally within the cylinder. A cylinder head at one end of the cylinder completes the cylinder assembly. A combustion chamber is defined by an inner wall of the cylinder, a top surface of the piston, along with the cylinder head. The cylinder head typically contains an intake and exhaust valve and a spark plug. The intake valve allows a pre-mixed fuel into a combustion chamber and the fuel is ignited by the spark plug. The exhaust valve allows the product of the combustion to be exhausted from the combustion chamber. During combustion, the piston moves reciprocally within the cylinder and eventually can wear down the inner walls of the cylinder. Cylindrical shaped liners have been developed to line the walls of the cylinder to increase the life of the cylinder. The liner may have coolant rings on its outer surface to form an annulus between the outer walls of the liner and the inner walls of the cylinder. The annulus provides a flow path for cooling liquid or air during combustion. Other types of liner may be press-fitted into the cylinder.

When the liner is worn below a predetermined thickness, it can be replaced with a new liner by using a conventional liner remover and installer. In order to remove a conventional liner, the cylinder head is removed from the cylinder assembly. The liner remover is placed on the cylinder block in order to provide leverage when the liner is removed. A conventional liner remover is comprised of a cylindrically shaped rubber component that can be inserted into the liner and then compressed to expand and frictionally engage the liner to remove it from the cylinder. Because the components are rubber, the rubber tends to disintegrate over time or melts if the liner is still hot from a combustion event. The inner wall of the liner can also become greasy due to contact with the pre-mixed fuel or oil in the cylinder. However, newer engines are made from aluminum, and the conventional liner removers are made from steel, which can scratch the cylinder bore during removal. If the cylinder bore is scored, coolant may enter the cylinder and damage the combustion chamber. Additionally, the liner remover and the installer base are typically placed on top of the cylinder block with no means of preventing lateral movements that can occur during installation or removal. The lateral movements can score the engine block's surface, which may need to be re-machined in order to function properly.

Therefore, there is a need for an apparatus and a method to remove the liner and to install a new one that will not score the engine cylinder or the engine block.

SUMMARY OF THE INVENTION

Embodiments of the present invention generally provide for an improved method and assembly for installing and removing a liner from an engine. The assembly can have a liner installer portion, a liner remover portion, and a base portion.

In one embodiment, a liner remover and installer assembly for an engine can include a base having an opening, at least one support member can be coupled to the base, a rod can be received in the opening, a first adjustment member can be coupled to the rod, a slot on a surface of the base and can be adapted to receive the first adjustment member, and a tool at an end of the rod. The at least one support member can be made from a material that will not damage the engine, and can be selected from a group that can include aluminum, an alloy, a metal, or a combination thereof. The at least one support member can further include an alignment feature at one end. The opening can allow movement of the rod in various directions. The tool can be selected from a group that can include a liner remover and a liner installer. The liner remover can include a shoe having a lip and a thrust bearing coupled to the first adjustment member. The liner installer may include a liner engager located between a second adjustment member and a thrust bearing. The first adjustment member can be coupled to a surface of the base. The lip can be made from a material that will not damage the engine, the material can be selected from a group that can include aluminum, an alloy, a metal, or a combination thereof. The rod can have a threaded outer surface.

A base for an engine tool is also provided and can include a platform having an opening therein, at least one support member coupled to the platform, an alignment feature at an end of the at least one support member, and a slot provided on a surface of the platform. The alignment feature can be adapted to fit an alignment member on an engine block. The at least one support member can be made from a material that will not damage the engine and can be selected from a group that can include aluminum, an alloy, a metal, or a combination thereof. The at least one support member can have a bore to receive a bolt that can mate with threads on the engine.

A method of removing or installing a liner in an engine can include aligning an alignment feature of a support member that can be coupled to a base with a protruding member of an engine, the base having an opening therein, coupling a first adjustment member to a slot on a surface of the base, the first adjustment member being coupled to a rod that is disposed in the opening, engaging the liner with a tool at one end of the rod, and moving the rod within an axis of a cylinder bore of the engine by adjusting the rod or by adjusting the first adjustment member. The tool can be selected from a group that can include a liner engager and a liner remover. The support member may be made from a material that will not damage the engine and may be selected from a group that can include aluminum, an alloy, a metal, or a combination thereof. Adjusting the rod can be accomplished by rotating the rod at a second end with a rotating member. Adjusting the first adjustment member may be accomplished by rotating the first adjustment member with a rotating member.

In a second embodiment, a liner remover and installer system includes a base means for support of a tool means, the base means having an opening, a support means for supporting the base means, a rod means for moving the tool means, the rod being disposed in the opening, an adjustment member means coupled to the rod means for axial adjustment of the rod means, and a slot means on a surface of the base means to receive the adjustment member means. The tool means can be selected from a group that can include a liner remover means and a liner installer means. The liner remover means may include a shoe means having a lip means. The lip means can be made from a material that will not damage the engine and the material can be selected from a group that may include aluminum, an alloy, a metal, or a combination thereof. The support means can include an alignment means for aligning with a fastening means of the engine block. The support means can be made from a material that will not damage the engine and the material can be selected from a group that can include of aluminum, an alloy, a metal, or a combination thereof. The support means and the lip means may not exceed an outer diameter of the liner.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
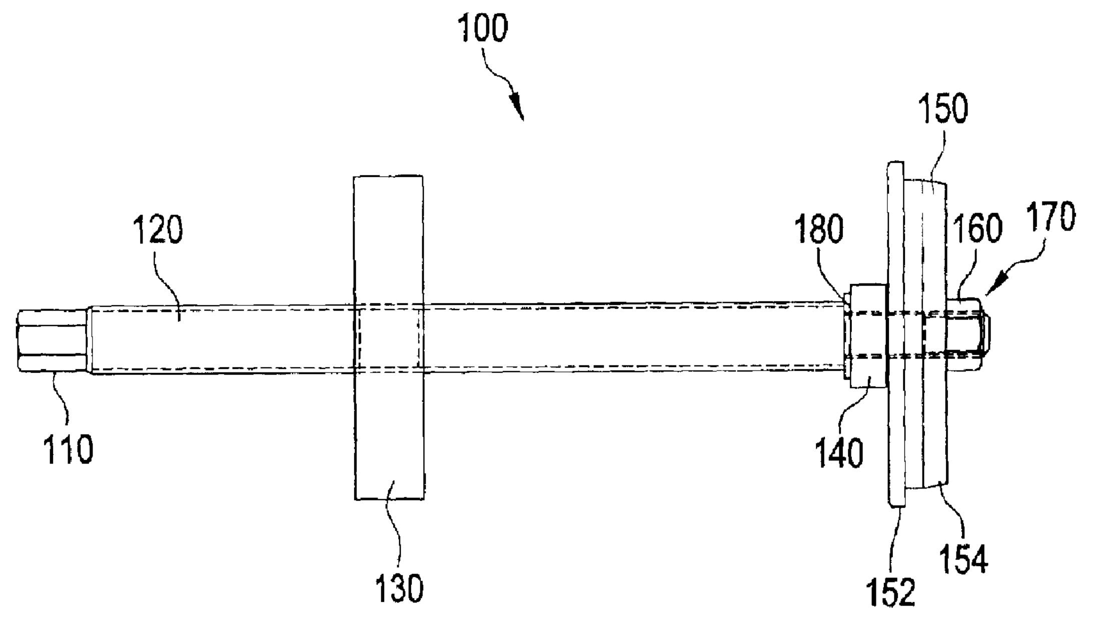
FIG. 1 is a side view of one embodiment of a liner installer portion.
Figure 2:
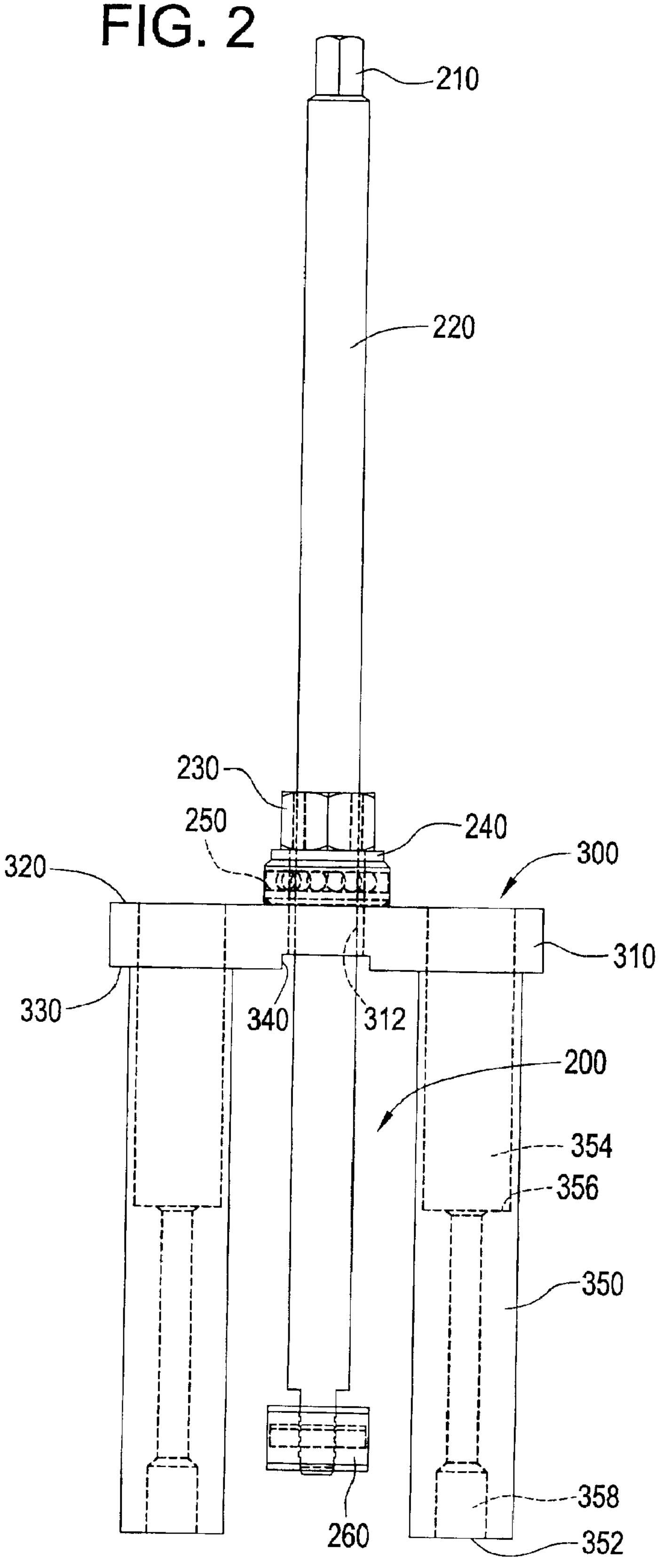
FIG. 2 is a side view of the liner remover portion and the base portion.
Figure 3:
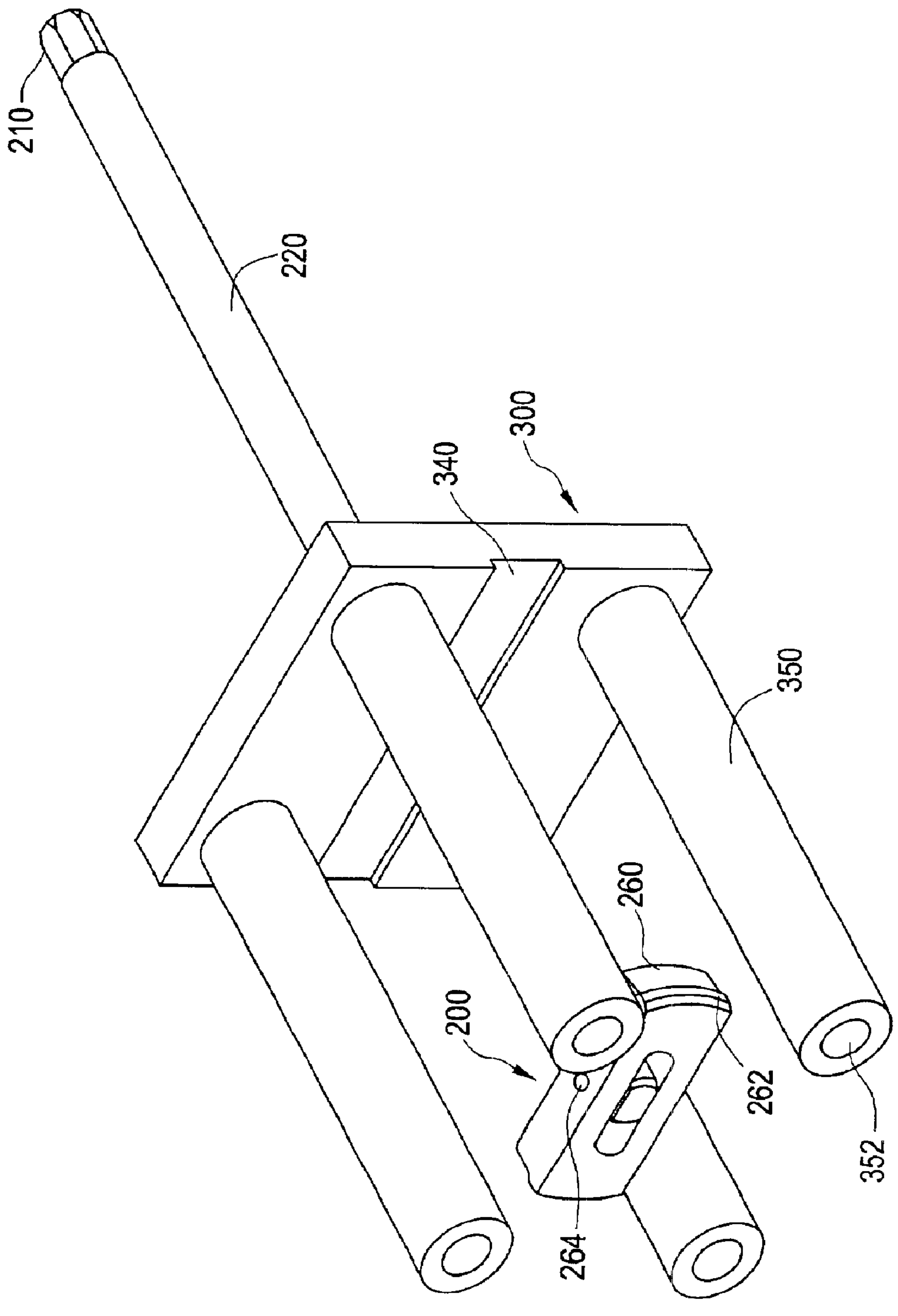
FIG. 3 is a perspective view of the liner remover portion and the base portion.

The liner assembly can have three major portions, which can include the liner installer portion 100 (FIG. 1), the liner remover portion 200 (FIGS. 2 & 3) and the base portion 300 (FIGS. 2 & 3). FIG. 1 is a side view of one embodiment of the liner installer portion 100. The liner installer portion 100 can have a rod 120 having a first end 110 and a liner engager 150 at a second end 170. The rod 120 can have threads on its outer surface. The first end 110 can be adapted to be turned or torqued by a torquing device (not shown), such as a wrench, pliers, screwdriver or similar device. By turning the first end 110 in a first direction, the rod 120 can be moved axially towards the second end 170 and by turning the first end 110 in a second direction, the rod can be moved axially towards the first end. These movements help to install the liner (not shown) in the cylinder bore (not shown). The rod 120 can be threaded to a first nut 130, which helps the movement of the rod to push and pull during liner installation. The first nut 130 can be adapted to fit in a slot 340 (FIGS. 2 & 3) that can be provided in the base portion 300. The slot 340 prevents rotational movement of the first nut 130, when the rod 120 is turned. The first nut 130 can be any shape or size so long as it is complementary to the slot 340 of the base portion 300. The first nut 130 is shown preferably being rectangular in shape.

Still referring to FIG. 1, a liner engager 150 can be coupled to the rod 120 between a first thrust bearing 140, a first washer 180, and a second nut 160. The liner engager 150 can be constructed and arranged to fit a conventional liner and may include an upper portion 152 that can be seated on top of the liner and a lower portion 154 that can be adapted to fit into an inner diameter of the liner. Conventional liner engagers are made from steel. With the advent of the aluminum engines, the steel liner engagers can score the liner (which can be made from steel), the cylinder block and bore. Thus, the liner engager 150 can be made from any material that will not score an engine or a liner, such as aluminum, an alloy, a metal or a combination thereof. The second nut 160 can be adjusted so that the liner engager 150 can rotate freely during the liner installation.

FIG. 2 is a side view of the liner remover portion 200 and the base portion 300. The base portion 300 may be constructed and arranged to receive either the liner installer portion 100 or the liner remover portion 200 at any given time. In FIG. 2, the liner remover portion 200 is shown installed in the base portion 300. The liner remover portion 200 can include a rod 220 having a first end 210, and a shoe 260 at a second end. The rod 220 can also be threaded on its outer surface. The first end 210 which can be adapted to be turned or torqued by a torquing device (not shown), such as a wrench, pliers, screwdriver or similar device.

The shoe 260 can have a lip portion 262 (FIG. 3) to engage the bottom portion of the liner. The lip 262 can be made of any material that will not score the engine. The material can be aluminum, an alloy, a metal or a combination thereof. Additionally, the shoe 260 and lip 262 can be properly sized so that the shoe and the lip may not exceed the outer diameter of the liner and score the engine when used. The shoe 260 may be coupled to the rod 220 by a pin 264. The pin 264 allows the shoe 260 to swivel with respect to pin so that the lip portion 262 can be manipulated, by using the rod 220, to engage the bottom portion of the liner.

The liner remover portion 200 can include a third nut 230 that is seated on a washer 240, which is seated on a second thrust bearing 250. The second thrust bearing 250 may serve to decrease the friction between a platform 310 of the base portion 300 and the third nut 230, thereby making it easier to turn or torque the third nut 230. The third nut 230 may be torqued by any conventional torquing device discussed above, which will move the rod 220 axially (towards the first end 210 or towards the shoe 260) to remover the liner.

Still referring to FIG. 2, the base portion 300 may include the platform 310 having a first side 320, a second side 330 and an opening 312 therein. The second side 330 may have the slot 340 therein to receive the first nut 130 of the liner installer portion 100. The slot 340 may be any shape or size so long as it is adapted to fit the first nut 130 or other nuts and prevents the nut from rotational movements. The slot 340 can be on the first side 320, the second side 330 or both. The base portion 300 may have at least one support member such as a post 350, preferably two posts 350, and more preferably four posts 350 to rest on the cylinder block. The posts 350 may have a bore 354 that originates from the first side 320 of the platform 310 and ends at a post opening 352.

The bore 354 is adapted to fit a bolt (not shown) that affixes the cylinder head (not shown) to the cylinder block (not shown). The bolt and the cylinder head were previously removed to provide access to the liner. The bolt can be seated on a shoulder 356 of the posts 350 and can protrude through the bore 354 and mates with threads in the cylinder block. The post opening 352 is adapted to receive a dowel pin (not shown) that protrudes from the engine block. The post opening 352 acts as an alignment feature for the base portion 300 because it is adapted to fit the dowel pin and prevents lateral movements during installation and removal of the liner that can score the cylinder block's surface. The post 350 may be any shape or size, so long as, the post has the post opening 352 at one end. Additionally, the post 350 may be made from aluminum, an alloy or a metal that will not score the cylinder block. Conventional support members are made from steel and other metals because the engines were made from steel. With the advent of aluminum engines, the steel support members can score and damage the engine block.

In order to install the liner remover portion 200 with the base portion 300, the rod 220 can be inserted from the second side 330 side into the opening 312 in the platform 310, with the shoe 260 at the lower end. Then the thrust bearing 250, the washer 240, and the third nut 230 can be added, respectively. In order to install the liner installer portion 100, the rod 120 can be inserted into the opening 312 in the platform 310 until the first nut 130 mates with the slot 340.

FIG. 3 is a perspective view of the liner remover portion 200 and the base portion 300. The liner remover portion 200 is installed with the base portion 300. The base portion 300 may have the slot 340 on the second side 330 that can mate with the first nut 130 of the liner installer portion 100 or in an alternative embodiment the third nut 230 of the liner remover portion 200. In this view, post 350 can have the post opening 352 at an end to mate with the dowel pin that is present on the cylinder block's surface. The post opening 352 can be any size or shape so long as it is constructed and arranged to mate with the dowel pin or any other protrusion (that may be on the surface) from the cylinder block. Also shown is the shoe 260 with the lip portion 262. The shoe 260 can be coupled to the rod 220 by the pin 264 and the shoe can be different sizes depending on the liner to be removed. The lip portion 262 can be adapted to fit any conventional liner.

In the liner installing operation, the liner installer portion 100 along with the first nut 130 are coupled to the base portion 300 and its slot 340. The liner engager 150 and its lower portion 154 are fitted with the liner. The base portion 300 is positioned above the cylinder bore with the post opening 352 of posts 350 mated with the dowel pin on the cylinder block. Because posts 350 can be made from aluminum, the posts will not score the aluminum cylinder block. The first end 110 of the rod 120 is torqued in a first direction, thereby lowering the rod, the liner engager 150, and the liner into the cylinder bore. By manipulating the first end 110 in the first direction and in the second direction, the rod 120 can move axially along with the liner engager 150 to press fit the liner into the cylinder bore. Additionally, when the first end 110 is moved in the first direction, the first nut 130 will want to move in the opposite direction, thereby keeping a tight contact with the slot 340.

In the liner removing operation, the liner remover portion 200 is coupled with the base portion 300. The appropriate shoe 260 with the appropriate lip 262 is coupled to the rod 220. By torquing the third nut 230 in a first direction, the rod 220 along with the shoe 260 can move axially into the cylinder bore. After the shoe 260 is at the appropriate level in the bore, the shoe can be manipulated by moving the rod 220 within the opening 312 of the platform 310 so that the lip 262 can be positioned below the liner to be removed. Once the lip 262 is in position, then the third nut 230 can be torqued in the second direction to remove the liner from the bore. The third nut 230 is torqued until the liner is removed from the cylinder bore.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A liner remover and installer assembly for an engine, comprising:

a base having an opening, said base having a first side and a second side;

at least one support member coupled to the base on the second side;

a rod extending through the first side and the second side of the base thereby being received in the opening;

a first adjustment member coupled to the rod;

a slot generally traversing across an entire surface of the base located on the second side adapted to receive the first adjustment member; and a tool at an end of the rod.

2. The liner remover and installer assembly of claim 1, wherein the at least one support member is made from a material that will not damage the engine.

3. The liner remover and installer assembly of claim 2, wherein the material can be selected from a group consisting of aluminum, an alloy, a metal, and a combination thereof.

4. The liner remover and installer assembly of claim 1, wherein the at least one support member further comprises an alignment feature at one end.

5. The liner remover and installer assembly of claim 1, wherein the opening allows movement of the rod in various directions.

6. The liner remover and installer assembly of claim 1, wherein the tool can be selected from a group consisting of a liner remover and a liner installer.

7. The liner remover and installer assembly of claim 6, wherein the liner remover comprises a shoe having a lip and a thrust bearing coupled to the first adjustment member.

8. The liner remover and installer assembly of claim 6, wherein the liner installer comprises a liner engager located between a second adjustment member and a thrust bearing.

9. The liner remover and installer assembly of claim 1, wherein the first adjustment member is coupled to a surface of the base.

10. The liner remover and installer assembly of claim 7, wherein the lip is made from a material that will not damage the engine.

11. The liner remover and installer assembly of claim 10, wherein the material can be selected from a group consisting of aluminum, an alloy, a metal, and a combination thereof.

12. The liner remover and installer assembly of claim 1, wherein the rod has a threaded outer surface.

13. The base of claim 12, wherein the at least one support member has a bore to receive a bolt that can mate with threads on the engine.

14. A liner remover and installer system comprising:

a base means for support of a tool means, the base means having an opening a first side and a second side;

a support means for supporting the base means on the second side;

a rod means for moving the tool means located at an end of the rod means, the rod means extending through the first side and the second side of the base means thereby being disposed in the opening;

an adjustment member means coupled to the rod means for axial adjustment of the rod means; and a slot means generally traversing across an entire surface of the base means located on the second side to receive the adjustment member means.

15. The liner remover and installer system of claim 14, wherein the tool means is selected from a group consisting of a liner remover means and a liner installer means.

16. The liner remover and installer system of claim 15, wherein the liner remover means comprises a shoe means having a lip means.

17. The liner remover and installer system of claim 16, wherein the lip means is made from a material that will not damage the engine and the material can be selected from a group consisting of aluminum, an alloy, a metal, and a combination thereof.

18. The liner remover and installer system of claim 16, wherein the support means and the lip means may not exceed an outer diameter of the liner.

19. The liner remover and installer system of claim 14, wherein the support means includes an alignment means for aligning with a fastening means of the engine block.

20. The liner remover and installer system of claim 19, wherein the support means is made from a material that will not damage the engine and the material can be selected from a group consisting of aluminum, an alloy, a metal, and a combination thereof.

* * * * *